Sept. 7, 1965 D. M. SMITH ETAL 3,204,896
GRANULAR MATERIAL SPREADER APPARATUS FOR HELICOPTERS
Filed March 26, 1964 2 Sheets-Sheet 1

DELFORD M. SMITH
NORMAN E. McGREW
INVENTORS.
BY
BUCKHORN, BLORE, KLARQUIST & SPARKMAN
ATTORNEYS

1

3,204,896
GRANULAR MATERIAL SPREADER APPARATUS
FOR HELICOPTERS
Delford M. Smith and Norman E. McGrew, McMinnville, Oreg., assignors to Evergreen Helicopters, Inc., McMinnville, Oreg., a corporation of Oregon
Filed Mar. 26, 1964, Ser. No. 355,056
14 Claims. (Cl. 244—136)

The present invention relates to apparatus for spreading fertilizers, insecticides, herbicides and other substances in granular form and more particularly to a granular material spreader apparatus for helicopters.

Helicopters are faster, more efficient and more adaptable to uneven terrain than conventional tractor-drawn equipment for carrying spreader apparatus, and are also more accurate and more maneuverable than airplanes for the same purpose. However, certain problems are presented in adapting helicopters for this use in that the spreader apparatus cannot be bulky because of the limited space available for mounting, and the apparatus and material must be supported and maintained very nearly in balance with respect to the helicopter's center of gravity in order to prevent uncontrolled pitch and roll of the helicopter in flight.

Accordingly, an object of the invention is to provide a new and improved granular material spreader apparatus for helicopters which obviates the above problems.

Another object of the invention is to provide a new and improved spreader apparatus which can be mounted on a helicopter so that its weight is distributed in balance about the helicopter's center of gravity so that the center of gravity does not shift during the material-spreading operations.

Another object is to provide a spreader apparatus for helicopters including a new and improved means for equalizing the flow of granular material from two or more supply tanks into the spreading mechanism and thereby maintaining the lateral balance of the helicopter during flight.

Another object of the invention is to provide a new and improved spreader apparatus for helicopters which is of compact construction and yet of high granular material-carrying and spreading capacity.

Another object is to provide a new and improved spreader apparatus for helicopters having a simplified drive means which is independent of the means for driving the helicopter rotor and remotely operable by the pilot in flight.

A further object is to provide a new and improved granular material spreader apparatus for helicopters that spreads material efficiently in a relatively wide, uniform swath which can be changed in width and density as desired.

A still further object is to provide a new and improved spreader apparatus for helicopters which is simple in construction and economical to operate.

In furtherance of the above objects and in accordance with the illustrative embodiment, granular material is caused to flow by gravity from a pair of matched supply tanks on opposite sides of a helicopter, downwardly through chutes into a receiver mounted centrally beneath the body of the helicopter. A flow regulating means within the receiver equalizes the rate of flow of granules from each tank into the input end of a screw conveyor within the receiver. The conveyor conveys the granules forwardly from the receiver and deposits them into a centrifugal-type slinger, which then disperses the granules in a relatively wide, uniform swath. An engine separate from and smaller than the helicopter engine is mounted beneath the body behind the receiver for driving the screw conveyor, which in turn drives the slinger.

The above and other objects and advantages will become apparent from the following detailed description which is given in connection with the accompanying drawings, of which:

Figure 1:
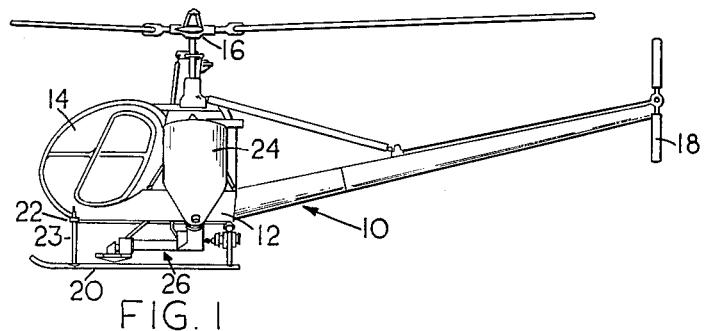
FIG. 1 is a side view of a helicopter having attached thereto a spreader apparatus in accordance with the invention.
Figure 2:
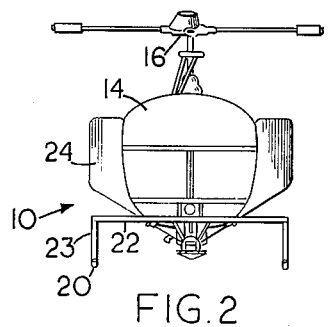
FIG. 2 is a front view of the helicopter and spreader apparatus of FIG. 1.

With reference to the drawings, FIGS. 1 and 2 illustrate a conventional helicopter 10 for which the present invention is adapted, including an elongate body 12 having a cabin 14 at its forward end, a rotor and control assembly 16 mounted just rearwardly of the cabin and a tail rotor 18 at its opposite end. The rotors are driven by a helicopter engine (not shown) supported on the body 12 just to the rear of the cabin 14. A nonretractable skid-type landing gear 20 is suspended beneath the body 12 from two horizontal, transversely extending cross members 22 by vertical struts 23.

The spreader apparatus is mounted on the exterior of the helicopter and includes a pair of identical supply tanks 24 for holding equal quantities of granular material. The tanks 24 are mounted on the body 12, one on each side of the helicopter engine and directly behind the cabin 14 in a position such that the center of gravity of the helicopter is not shifted appreciably by the filling of the tanks with granular material and the discharge of the material from the tanks. Maintenance of proper balance is an important consideration in controlling a helicopter. For this reason not only the tanks, but the entire spreader apparatus and its load are mounted so that their combined weight is distributed substantially uniformly about the helicopter's center of gravity during flight. From FIG. 2 it will be evident that the inwardly facing surfaces of the tanks 24 are contoured to conform to the configuration of the adjacent surfaces of the body and helicopter engine.

Figure 3:
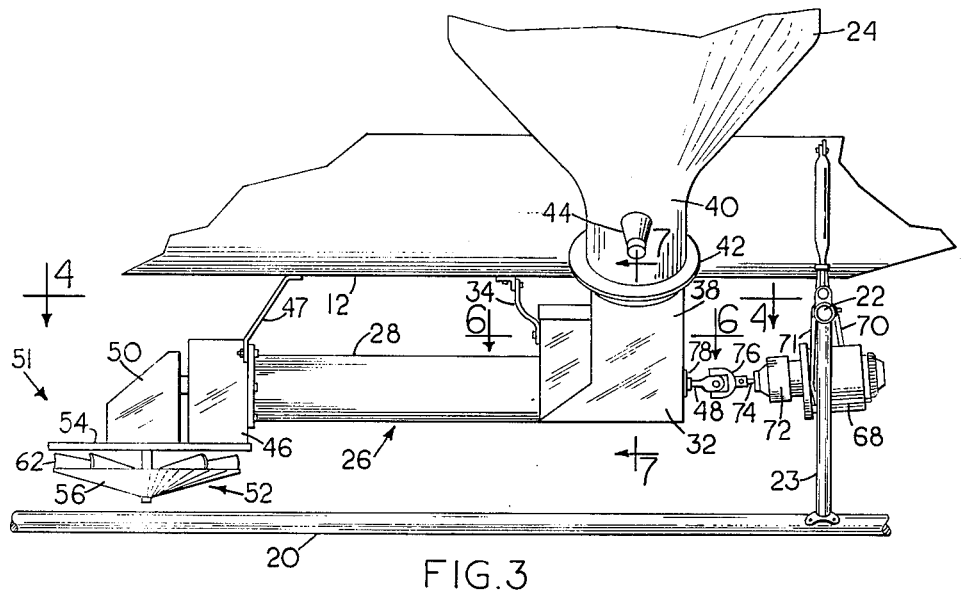
FIG. 3 is an enlarged side view showing a major portion of the spreader apparatus.
Figure 4:
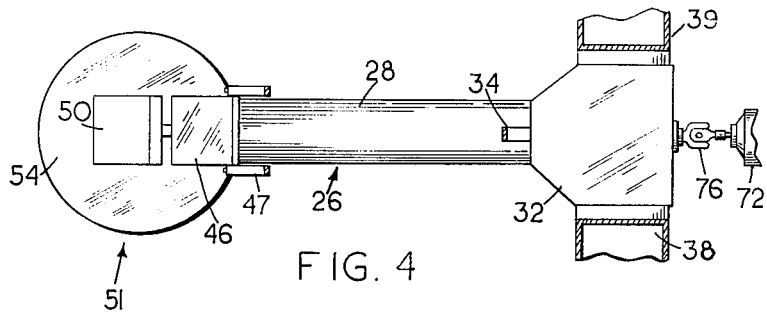
FIG. 4 is a horizontal sectional view taken along the line 4—4 of FIG. 3 showing most of the spreader apparatus in plan.

As shown in detail in FIG. 3, the other portions of the spreader apparatus are mounted generally centrally beneath the body 12 and above the landing skids 20. To provide sufficient clearance space between the spreader apparatus and the ground surface when the helicopter is at rest, it has been found necessary in at least some instances to employ vertical struts 23 which are longer than those usually furnished.

Figure 6:
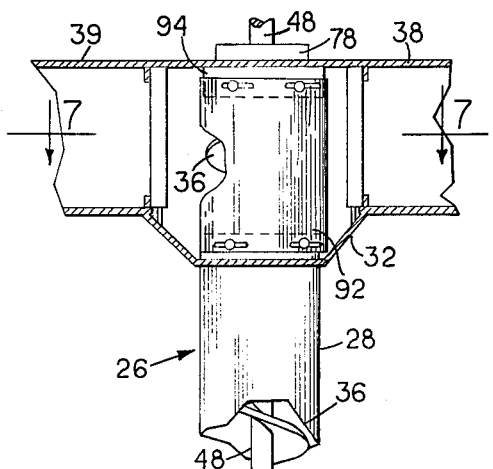
FIG. 6 is a horizontal sectional view taken along the line 6—6 of FIG. 3.

The spreader apparatus includes a screw conveyor 26 extending longitudinally beneath the body 12 and having a casing 28. The rear end of the casing 28 is connected to and supported by a receiver housing 32 which is suspended centrally beneath the body 12 by a mounting bracket 34. The rear, or input, end portion of the auger 36 of the conveyor 26 extends beyond the rear end of the casing 28 and into the receiver housing 32, as shown most clearly in FIG. 6.

A pair of chutes 38, 39 of generally rectangular cross section are inclined steeply upwardly and outwardly in V-form from the opposite sides of the receiver housing 32 and are each connected at their upper end to a downwardly projecting neck portion 40 of a tank 24 by an elastic sleeve coupling 42. The slope of the chutes is greater than the angle of repose of the often hygroscopic granular material to be spread in order that the material will flow readily by gravity from the tanks 24 into the receiver 32 without bridging in the chutes. Each neck 40 is provided with a spout 44 for emptying the associated tank 24 of granular material when desired, but the end of such spout is normally closed with a cap.

Figure 5:
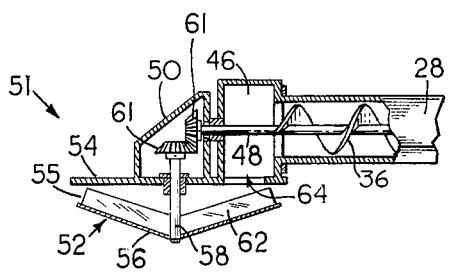
FIG. 5 is a vertical section view taken along the line 5—5 of FIG. 4.

The forward, discharge end portion of the casing 28 for the screw conveyor 26 is connected to and supported by an enlarged discharge chamber 46 into which granular material is deposited by the auger 36, the helix portion of which terminates at the forward end of the casing 28, as shown clearly in FIG. 5. The chamber 46 is in turn supported from the body 12 of the helicopter by brackets 47. The forward end portion of the shaft 48 of the auger 36 extends through the chamber 46 and terminates within a gear box 50, thus serving to drive the spreading element or slinger of the spreader as explained below.

The spreader 51 includes a centrifugal-type slinger 52 which depends from the bottom of the chamber 46 and gear box 50. As shown best in FIG. 5, the slinger includes an upper, stationary plate 54 which defines the bottom wall of both the chamber 46 and gear box 50, and a conically shaped rotary disc 56 spaced beneath the stationary plate 54 to define a peripheral opening 55 in the slinger. The rotary disc 56 is affixed to the lower end of a vertical drive shaft 58 which extends upwardly through the center of the stationary plate 54 into the gear box 50. A bevel gear 60 on the upper end of the vertical shaft 58 meshes with a similar bevel gear 61 on the forward end of the conveyor drive shaft 48, so that rotation of the conveyor shaft 48 drives the rotary disc 56.

A plurality, in this instance six, equally spaced, upstanding vanes 62 radiate outwardly from a lower portion of the vertical shaft 58 and are affixed to the inclined upper surface of the disc 56 as to rotate with such disc. The vanes are each curved in cross section so as to present a concave slinging surface in the direction of rotation of the disc 56, which as viewed from above, is clockwise.

The stationary plate 54 has an aperture 64 positioned beneath the chamber 46, so that granules pushed into the chamber by the auger 36 drop onto the rotary disc 56, from which they are subsequently propelled in an arc outwardly through the peripheral opening 55 by the whirling vanes 62.

Power for driving the conveyor 26 and the slinger 52 is provided by a small internal combustion engine 68, such as a chain saw motor, which is suspended by a pair of support straps 70 and 71 from the rear cross tube 22 for the landing skids 20. The engine drives the conveyor shaft 48 through a speed reduction gear unit 72 and a drive shaft 74 which is connected by a universal joint 76 to a rearwardly projecting end portion of the conveyor shaft 48. This end of the shaft 48 is mounted in a bearing 78 at the rear of the receiver housing 32. The two-speed engine 68 is equipped with a conventional chain saw centrifugal clutch (not shown) which is automatically disengaged at idling speed of the engine but which engages at a higher or operating engine speed to drive the shaft 74 and thus the conveyor 26 and slinger 52.

Figure 8:
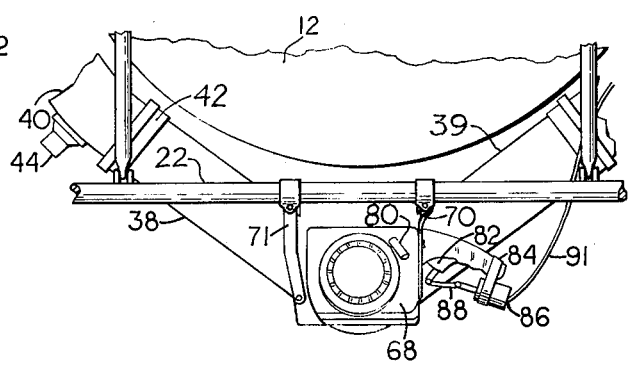
FIG. 8 is a rear elevational view of the lower portion of the spreader apparatus.
Figure 9:
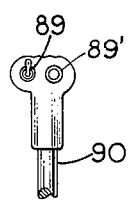
FIG. 9 is a fragmentary view of the cyclic control lever of a helicopter showing a suitable portion of a control switch for the engine that drives the spreader apparatus.

As shown best in the rear end view of FIG. 8, the engine 68 has a starter rope 80 which is employed to start the engine before take-off. The engine then idles at low speed. A conventional throttle control trigger 82 mounted in the handle 84 of the engine can be depressed to increase the engine speed. A remote control is provided for depressing the trigger 82 from within the cabin 14 while the helicopter is aloft. This control includes a solenoid 86 mounted on the handle 84, which solenoid has its plunger connected by suitable mechanical linkage 88 to the trigger 82 for depressing the latter upon energization of the solenoid from the electrical system of the helicopter. A switch 89, mounted adjacent a conventional trim switch 89' on the cyclic control lever 90, partly shown in FIG. 9 and positioned within the cabin 14, is connected by a suitable conductor wire 91 to the solenoid 86, thereby enabling the helicopter pilot to cause actuation of the solenoid plunger and thus start and stop the spreading apparatus in flight.

It is important that the rate of flow of granular material from each of the two tanks 24 into the screw conveyor 26 be equalized. As shown most clearly in FIGS. 6 and 7, a bridge member 92 partially covers the portion of the auger 36 within the receiver 32, and extends from the front to the back wall of the receiver. The bridge member 92 is mounted for circumferential adjustment about the axis of the auger on an inwardly extending ledge portion 94 on the back wall, and on an inwardly extending end portion of the conveyor casing 28 respectively.

Figure 7:
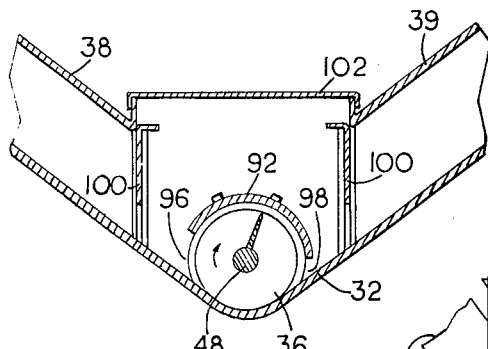
FIG. 7 is a vertical sectional view taken along the line 7—7 of FIG. 6.

As shown in FIG. 7, the bridge member 92 is curved in a transverse direction and is adjusted so as to provide a relatively large feed opening 96 into the screw conveyor 26 from the left-hand chute 38 as viewed from the rear of the helicopter and a second, smaller feed opening 98 from the right-hand chute 39. The bridge 92 is adjusted so that the relative sizes of the feed openings 96 and 98 permit material to flow into the conveyor from both chutes 38 and 39 at the same rate when the auger is rotating, thereby ensuring that the two tanks 24 always contain very nearly equal quantities of material at all stages of the spreading operation and empty the two tanks at approximately the same time so as to maintain the helicopter in lateral balance at all times.

In the illustrated embodiment of FIG. 7 the screw 36, as viewed from the rear, rotates in a clockwise direction. This causes the screw to draw a greater proportion of material from the right-hand chute 39 than from the left-hand chute 38. To compensate for this tendency, the bridge 92 is adjusted toward the chute 39 to reduce the size of the opening 98 and thereby impede somewhat the flow of material from such chute. The amount of adjustment required to equalize the flow in any instance will depend on several factors, including the size, weight and nature of the granules, the speed and pitch of the auger, the slope of the chutes and the peculiar characteristics of each receiver housing. The bridge member also prevents a mass of the granular material from packing in the convolutions of the conveyor during the time the helicopter is flying from a loading station to an area where the granular material is to be spread. During this time the normal vibration to which the body of a helicopter is subjected during flight will tend to pack the granular material until difficulty is encountered in starting the conveyor auger.

A pair of calibration plates 100 of identical size are removably mounted vertically within the receiver 32 so as to partially cover the entrance openings of the chutes 32 into the receiver. These plates regulate the rate of flow of material from the tanks into the receiver and function substantially independently of the openings 96 and 98 defined by the bridge member 92. The maximum rate of flow desired will depend on the size and nature of the granular material being spread and the desired density of the swath. To change the maximum rate of material flow into the receiver, the plates 100 can be replaced with smaller or larger plates as necessary. The receiver 32 is provided with a removable cover 102 for access into the interior of the receiver for adjustment of the bridge member 92 and replacement of the plates 100.

In operation, the supply tanks are filled with the desired insecticide, fertilizer, weed or brush killer or the like in granular form, and, prior to take-off, the engine 34 is started. With the engine operating at low speed, the helicopter is flown to the preselected area to be treated, whereupon the helicopter operator actuates the switch 89 to increase the speed of the engine and thus commence a spreading operation. The granular material delivered into the rear portion of the slinger is carried partly around the slinger and discharged over approximately the front 180° sector of the slinger. A spreader apparatus of the type described is capable of dispersing granular material in a swath of up to 50 feet in width and of uniform density ranging from 10 pounds to a thousand pounds of granulated matter per acre. The width of the swath can be changed as desired by changing the speed of rotation of the slinger, which can in turn be regulated by chaging the gear ratio of the speed reducer 72. The density of material per acre can also be varied by varying the speed of the helicopter, by changing the size of the calibration plates 100 or by replacing the auger 36 with one of a different pitch.

Having illustrated and described a preferred embodiment of the invention, it should be apparent to those skilled in the art that the invention permits of modification in arrangement and detail. We claim as our invention all such modifications as come within the true spirit and scope of the appended claims.

We claim:

1. Granular material spreader apparatus for a helicopter having a body, landing gear means beneath said body, and a predetermined center of gravity, said spreader apparatus comprising:

a pair of supply tank means of equal capacity mounted on opposite sides of said body in balance with respect to said center gravity for storing a supply of granular material to be spread, common centrifugal slinger means beneath said body in communication with the lower ends of both said supply tank means for projecting granules from said tank means in a wide horizontal arc forwardly beneath said body, and equalizer means between said spreader means and said pair of supply tank means for establishing and maintaining equal flow from said tanks and thereby maintaining said tanks in balance with respect to said center of gravity throughout the material spreading operation, and power means for driving said spreader means.

2. Granular material spreader apparatus for a helicopter having a body and landing gear means spaced beneath said body, said spreader apparatus comprising:

a pair of supply tank means of the same shape and capacity for storing equal quantities of granular material, means for mounting one of said tanks on each of the opposite sides of said helicopter, common conveyor means connected to both of said supply tanks for conveying said granular material from both said tanks simultaneously, including means at the input end of said conveyor means for maintaining equal flow of material from said pair of tank means, and centrifugal slinger means positioned between the underside of said body and the lower extremity of said landing gear means and connected to the discharge end of said conveyor means for projecting granules in a wide horizontal arc forwardly beneath said body.

3. Granular material spreader apparatus for a helicopter having a body and landing gear means spaced beneath said body, said spreader apparatus comprising:

a pair of supply tanks of the same size and shape mounted on laterally opposite sides of said body for carrying equal weights of granular material to be spread, single spreading means for both said tanks mounted centrally beneath said body for dispersing said granular material from both said tanks in a laterally extending generally horizontal swath, common conveyor means beneath said body connecting said spreader means and both said supply tanks for conveying said granular material from said tanks to said spreading means, an equalizer means at the confluence of the outflows from said supply tanks for equalizing the outflow of material from said tanks into said conveyor means.

4. Granular material spreader apparatus for a helicopter having a body and landing gear means spaced beneath said body, said spreader apparatus comprising:

a pair of supply tanks of the same capacity mounted on laterally opposite sides of said body in balance with respect to the center of gravity of said helicopter for carrying equal weights of granular material to be spread, rotatable spreading means mounted centrally beneath said body for dispersing said granular material from both said tanks in a generally horizontal swath, a movable conveyor between said spreader means and said supply tanks and common to both said tanks for conveying said granular material generally horizontally from both said tanks to said spreading means, flow equalizing means at the input end of said conveyor for equalizing the rate of flow of material from said supply tanks and thereby maintaining the center of gravity of said helicopter in a substantially fixed position throughout the spreading operation, and a prime mover mounted beneath said body for driving both said conveyor means and said spreading means.

5. Granular material spreader apparatus for a helicopter having a body including a cabin, landing gear means beneath said body, and a predetermined center of gravity, said spreader comprising:

at least two supply tank means mounted on laterally opposite sides of said body in lateral and longitudinal balance with one another about said center of gravity, rotatable spreading means mounted centrally beneath said body and above said landing gear means for spreading granular material in a generally horizontal swath, screw conveyor means beneath said body connecting the lower ends of said supply tank means and said spreading means for conveying said granular material to said spreading means, equalizer means between said tanks and said screw conveyor means for emptying said two supply tank means at the same rate so that said predetermined center of gravity is maintained throughout the material spreading operation, a prime mover beneath said fuselage for driving said conveyor means and said spreading means, and remote control means on said prime mover for controlling the operation of said spreading means from inside said cabin while said helicopter is in flight.

6. Granular material spreader apparatus for a helicopter having a body and landing gear means spaced beneath said body, said spreader apparatus comprising:

a horizontally disposed slinger mounted centrally beneath said fuselage above the ground-engaging surfaces of said landing gear means for slinging granular material horizontally in a relatively wide swath, a pair of supply tanks of similar shape for storing equal quantities of said granular material, mounted one on each of laterally opposite sides of said body above said slinger, a screw conveyor disposed longitudinally beneath said body at an elevation slightly above said slinger for conveying granular material from said tanks to said slinger, chute means extending from the bottom ends of said tanks for directing the gravity flow of granular material into said screw conveyor, flow equalizer means at the input end of said conveyor means for equalizing the rate of flow of said granular material from said tanks into said conveyor means so that the initial center of gravity of said helicopter when said supply tanks are fully loaded is maintained in substantially the same position throughout the spreading operation, and a prime mover beneath said body for driving said conveyor means and said slinger.

7. Granular material spreader apparatus for a helicopter having a body and landing gear means spaced beneath said body, said spreader apparatus comprising:

a pair of supply tanks of similar shape and equal capacity mounted one on each of opposite sides of said body, a screw conveyor disposed centrally and longitudinally beneath said body, spreading means mounted at the discharge end of said screw conveyor, a receiver housing at the input end of said screw conveyor and connected to said tanks for receiving granular material from said tanks and directing said material into said screw conveyor, and flow equalizer means within said receiver housing defining a pair of openings, one for the admission of granular material from each of said tanks, said flow equalizer means being adjustable for regulating the relative sizes of said openings and thereby equalizing the flow rate of material from each of said tanks.

8. Spreader apparatus according to claim 7 wherein said flow equalizer means comprises a laterally adjustable bridge member partially covering the input end portion of the auger for said screw conveyor means.

9. Granular material spreader apparatus for a helicopter having a body and landing gear means beneath said body, said spreader apparatus comprising:

a pair of matched supply tanks of equal capacity mounted one on each of opposite sides of said body, a receiver housing mounted centrally beneath said body and above said landing gear means, for receiving material from said supply tanks, a pair of inclined chute means extending upwardly from said receiver housing one to each of said supply tanks for directing by gravity flow material from said supply tanks into said housing, a screw conveyor extending from within said receiver housing forwardly beneath said body, horizontally disposed slinger means mounted at the forward discharge end of said screw conveyor and beneath the latter for dispersing granular material in a relatively uniform swath beneath said helicopter, adjustable flow equalizer means within said receiver housing partially covering the input end of said screw conveyor for equalizing the flow of material from each of said chute means into said conveyor, and power means including an engine mounted beneath said body rearwardly of said receiver for simultaneously driving said conveyor and said slinger.

10. Spreading apparatus according to claim 9 wherein said power means includes a drive shaft from said engine connected to the shaft of said screw conveyor means and gear means connecting said screw conveyor shaft to a rotary portion of said slinger, so that rotation of said drive shaft simultaneously drives said conveyor and said slinger.

11. Spreader apparatus according to claim 5 wherein said prime mover has an idling speed and a driving speed, a drive shaft connected to said conveyor means, and a centrifugal clutch which becomes engaged to drive said shaft at said driving speed only, and further wherein said remote control means includes a solenoid on said engine for actuating an engine speed control switch, and means within said body for energizing said solenoid.

12. Granular material spreader apparatus for a helicopter having a body and landing gear means beneath said body, said spreader apparatus comprising:

a pair of supply tanks of equal capacity arranged in spaced-apart, side-by-side relationship for mounting one on each of opposite sides of said body, a receiver housing spaced centrally beneath said tanks, V-shaped chute means connecting the bottom ends of said tanks and said receiver housing for directing the gravity flow of granular material from said tanks into said housing, conveyor means extending generally horizontally from within said receiver housing, spreading means mounted at the discharge end of said conveyor means for receiving granular material from said conveyor means and spreading said material in a swath beneath said body, power means connected to said conveyor means for driving said conveyor and said spreading means, flow equalizer means within said receiver housing for equalizing the flow rate of material from each of said supply tanks into said conveyor means and thereby maintaining the lateral balance of said helicopter throughout the material spreading operation, and calibration plate means within said receiver housing and partially covering the passages from said chute means for establishing the maximum rate of flow of material from said tanks into said receiver housing.

13. In granular material spreader apparatus for a helicopter having a body and landing gear means mounted beneath said body, said spreader apparatus including a pair of matched supply tanks of equal capacity mounted symmetrically on laterally opposite sides of said body, and power means for driving said spreader apparatus, the invention comprising in combination:

horizontally disposed centrifugal spreader means for dispensing granular material in a horizontal swath beneath said body, screw conveyor means connected at its discharge end to said spreader means, a receiver housing at the opposite, input end of said screw conveyor means, a pair of chute means extending from opposite sides of said receiver housing for directing the gravity flow of granular material from said supply tanks into said conveyor means, and flow equalizer means within said receiver housing for equalizing the rate of flow of material from each of said chute means into said conveyor means so that the center of gravity of said helicopter remains unchanged throughout the spreading operation.

14. Spreader apparatus according to claim 6 wherein said slinger includes:

an upper, stationary plate connected to one end of said conveyor means, a rotatable vertical shaft extending centrally through said plate, an upwardly inclined conical disc spaced beneath said plate and affixed to the lower end of said shaft, a plurality of equally spaced-apart vanes radiating from said shaft on the inner surface of said disc, said upper plate having an opening therethrough through which material from said conveyor means is discharged onto said rotary disc, and means connected to said conveyor means for rotating said shaft and thereby slinging said material in an arc forwardly through the peripheral space between said plate and said disc.

References Cited by the Examiner

UNITED STATES PATENTS

| | | | |
|---|---|---|---|
| 1,604,290 | 10/26 | King | 244—136 |
| 1,749,504 | 3/30 | Pelton | 244—136 |
| 2,098,887 | 11/37 | Satterlee | 244—136 |
| 2,528,986 | 11/50 | Adams | 244—136 |
| 2,597,323 | 5/52 | Hiller | 244—136 |
| 2,680,648 | 6/54 | Price | 239—171 |
| 2,812,913 | 11/57 | Nissen | 244—136 |

MILTON BUCHLER, *Primary Examiner.*

FERGUS S. MIDDLETON, *Examiner.*